United States Patent
Fujan et al.

(10) Patent No.: US 6,754,945 B2
(45) Date of Patent: Jun. 29, 2004

(54) METHOD OF FORMING A STRESS ISOLATING JOINT ON A DUMP BODY

(76) Inventors: Steven J. Fujan, 8140 S. Pittsburg Ave., Tulsa, OK (US) 74137; William R. Borthick, 13789 Glen, Glenpool, OK (US) 74033

(*) Notice: Subject to any disclaimer, the term of this patent is extended or adjusted under 35 U.S.C. 154(b) by 0 days.

(21) Appl. No.: 10/400,996

(22) Filed: Mar. 27, 2003

(65) Prior Publication Data

US 2003/0189084 A1 Oct. 9, 2003

Related U.S. Application Data

(62) Division of application No. 10/151,801, filed on May 21, 2002, now Pat. No. 6,568,744.
(60) Provisional application No. 60/294,143, filed on May 29, 2001.

(51) Int. Cl.[7] .................................................. B23P 13/04
(52) U.S. Cl. ........................ 29/557; 29/428; 29/462; 29/469; 29/524; 29/527.1; 228/165; 228/174
(58) Field of Search ................... 29/428, 434, 462, 29/469, 524, 525.01, 525.02, 525.03, 525.08, 525.13, 525.14, 527.1, 557; 296/183, 184, 187; 298/1 R, 17 R, 22 R, 7; 228/165, 170, 174

(56) References Cited

U.S. PATENT DOCUMENTS

| | | | | |
|---|---|---|---|---|
| 1,290,091 A | * | 1/1919 | Cole | 52/459 |
| 1,872,616 A | * | 8/1932 | Andren | 411/183 |
| 2,140,672 A | * | 12/1938 | Gray et al. | 156/92 |
| 2,593,506 A | * | 4/1952 | Wales | 29/432 |
| 2,679,468 A | * | 5/1954 | Pitman | 428/57 |
| 3,006,443 A | * | 10/1961 | Siler | 403/408.1 |
| 3,571,552 A | * | 3/1971 | Opal | 219/108 |
| 3,596,043 A | * | 7/1971 | Sporri | 219/83 |
| 3,815,296 A | * | 6/1974 | Crutcher | 52/45 |
| 3,860,778 A | * | 1/1975 | Rudd et al. | 219/67 |
| 4,004,124 A | * | 1/1977 | Nakane et al. | 296/191 |
| 4,044,414 A | * | 8/1977 | Grycel, III | 114/355 |

(List continued on next page.)

FOREIGN PATENT DOCUMENTS

| | | | |
|---|---|---|---|
| DE | 19625873 | 8/1998 | |
| DE | 19808122 | 9/1999 | |
| EP | 0771605 | 7/1997 | |
| GB | 2158015 | 11/1985 | |
| JP | 63056366 A | * 3/1988 | .......... B23K/11/10 |
| JP | 03115635 A | * 5/1991 | ............ E04B/1/58 |
| JP | 09141427 A | * 6/1997 | ............ B23K/9/02 |
| JP | 11287619 A | * 10/1999 | .......... G01B/11/00 |
| JP | 2001087879 A | * 4/2001 | .......... B23K/26/00 |
| JP | 2002018583 A | * 1/2002 | .......... B23K/26/00 |
| JP | 2002239722 A | * 8/2002 | ............ B23K/9/02 |

OTHER PUBLICATIONS

PCT International Search Report dated Oct. 1, 2002.

*Primary Examiner*—Essama Omgba
(74) *Attorney, Agent, or Firm*—Marshall, Gerstein & Borun LLP

(57) ABSTRACT

A method of forming a stress isolating joint on a dump body of on an off-highway rubber-tired haulage vehicle includes providing a first plate having an elongated edge, a top side, and a face, and providing a second plate including an elongated edge. Overlapping the first and second plates to define a widened seam bounded at least in part by the elongated edges of the respective plates, and welding along the elongated edge of the first plate to join the elongated edge of the first plate to an adjacent surface of the second plate. The weld and at least a portion of the second plate disposed along the widened seam cooperate to permit the second plate to apply a resisting load to the face of the first plate in response to the application of a load against an opposing face of the first plate.

11 Claims, 9 Drawing Sheets

U.S. PATENT DOCUMENTS

| | | | |
|---|---|---|---|
| 4,142,664 A | * 3/1979 | Feige | 228/165 |
| 4,163,869 A | * 8/1979 | Almand, III et al. | 174/94 R |
| 4,359,599 A | * 11/1982 | Benner | 174/94 R |
| 4,530,147 A | * 7/1985 | Mattei et al. | 29/525 |
| 5,060,582 A | * 10/1991 | Salzer | 109/49.5 |
| 5,518,285 A | 5/1996 | Dick | |
| 5,665,187 A | * 9/1997 | Mackellar | 156/91 |
| 6,138,419 A | * 10/2000 | Sekiguchi et al. | 52/235 |
| 6,373,027 B1 | * 4/2002 | Jeong | 219/158 |
| 6,415,496 B1 | * 7/2002 | Dominguez Casado et al. | 29/525.01 |
| 6,439,649 B1 | 8/2002 | Lorenzo et al. | |
| 6,479,168 B2 | * 11/2002 | Mazumder et al. | 428/659 |
| 6,568,744 B2 | * 5/2003 | Fujan et al. | 296/184 |
| 6,622,366 B2 | * 9/2003 | Luffel et al. | 29/434 |
| 6,625,865 B1 | * 9/2003 | Munkholm | 29/557 |
| 6,669,396 B2 | * 12/2003 | Mattle | 403/294 |
| 6,688,000 B2 | * 2/2004 | Wang et al. | 29/897.2 |

\* cited by examiner

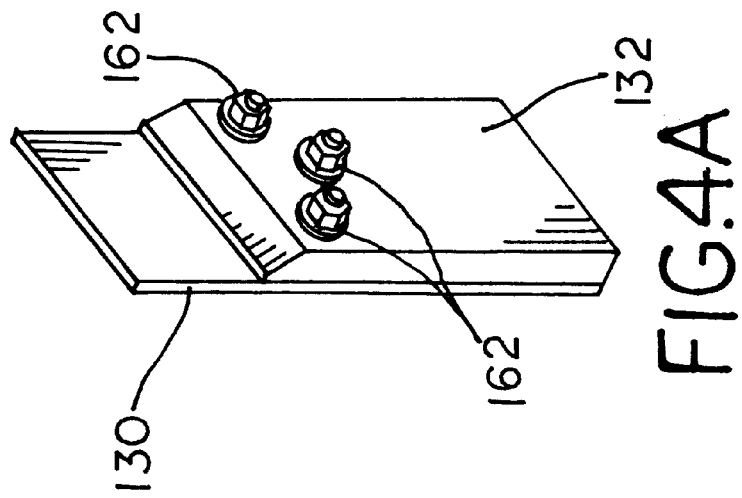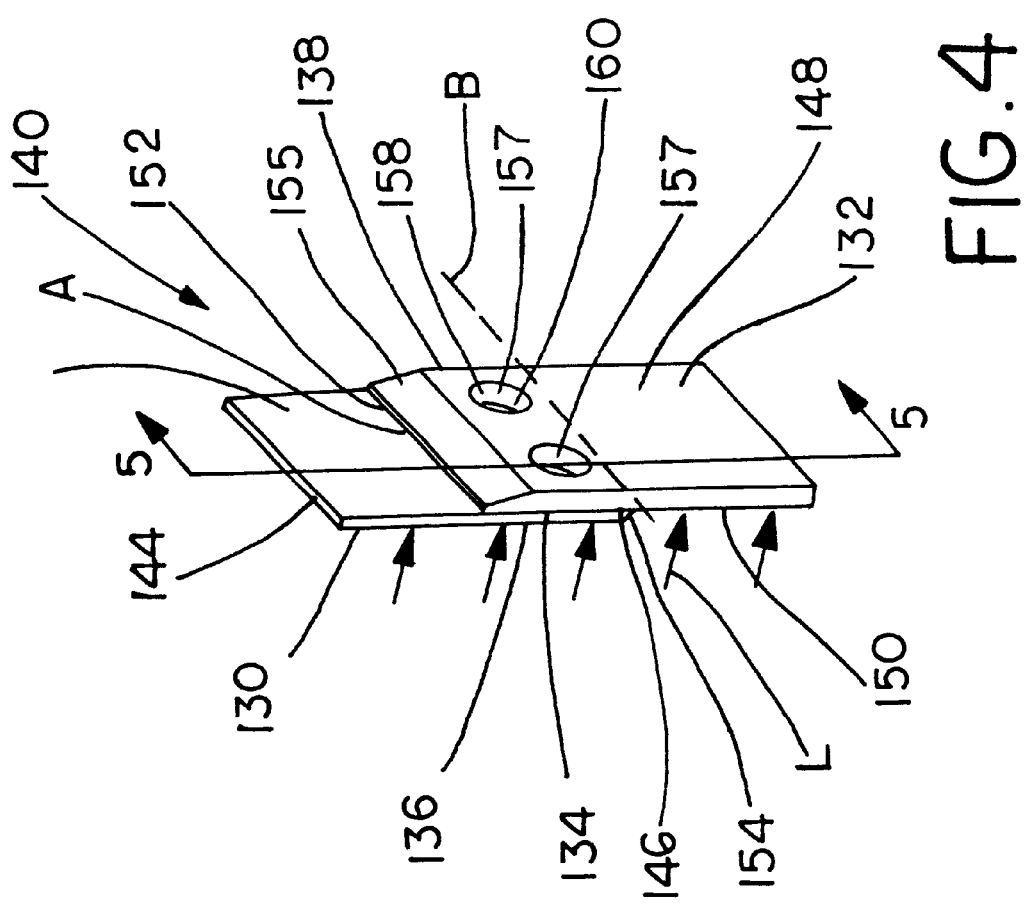

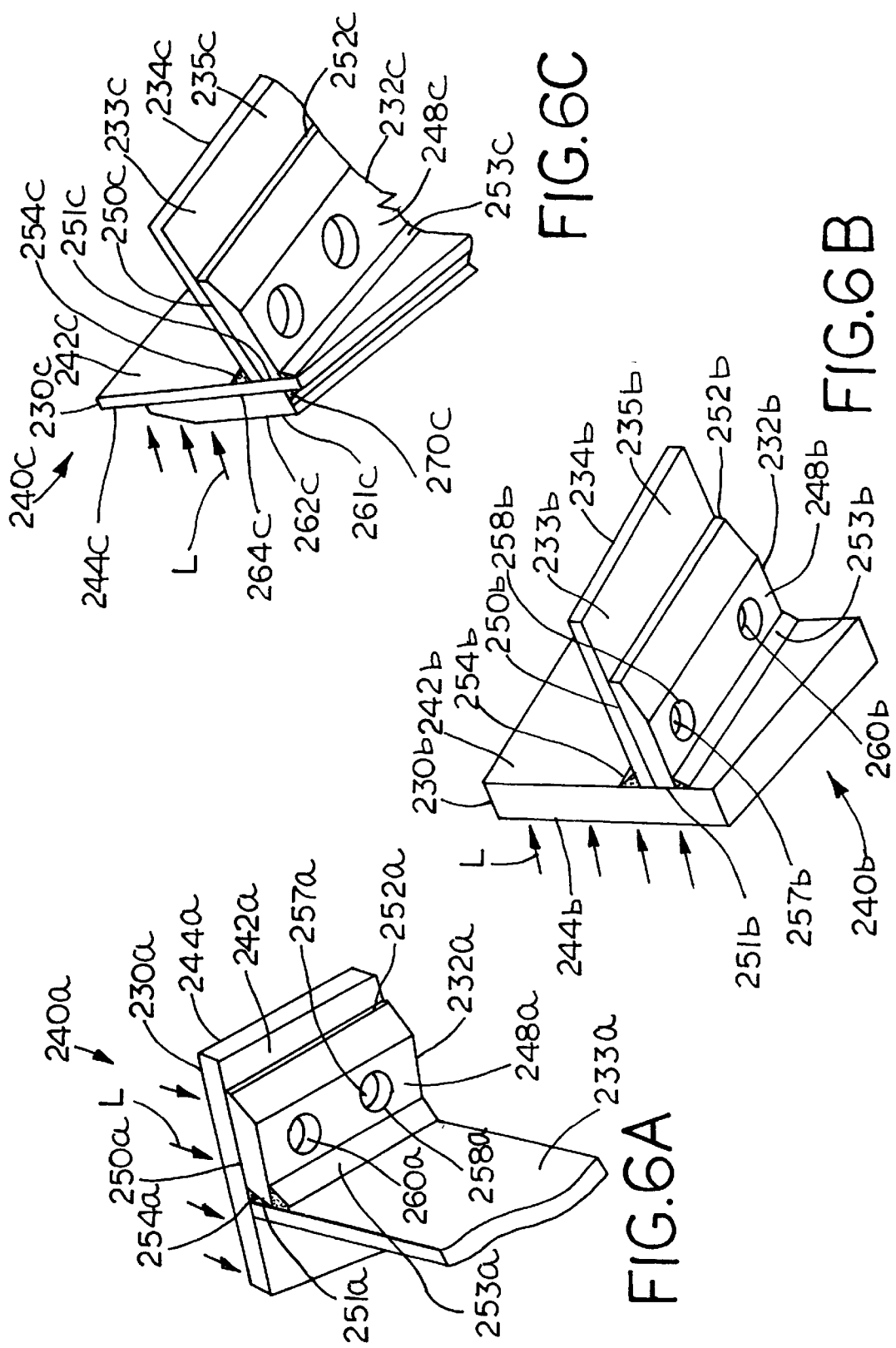

METHOD OF FORMING A STRESS ISOLATING JOINT ON A DUMP BODY

RELATED APPLICATIONS

This application is a division of U.S. application Ser. No. 10/151,801 filed May 21, 2002 now U.S. Pat. No. 6,568,744, which claims priority from U.S. Provisional Application Serial No. 60/294,143, filed May 29, 2001.

FIELD OF THE INVENTION

The present invention relates generally to dump bodies for off-highway rubber tired haulage vehicles, such as dump trucks. More specifically, the present invention relates to a joint isolation system for reducing stress in joints between adjacent plates or other components in a dump body.

BACKGROUND OF THE INVENTION

Dump bodies for off-highway rubber tired haulage vehicles are typically constructed from a plurality of plates that have been welded together. According to common practice, dump bodies include a floor, sidewalls, and a front wall. Many times a cab protector is attached to the top edge of the front wall in order to protect the truck cab during loading operations.

According to common practice, the plates which form the bulk of the load carrying surfaces are joined, such as by welding, to adjacent plates and/or supporting frame members to form the finished dump body. In order to keep the overall weight of the dump body below a desired level, manufacturers often try to use the thinnest plates possible. However, it is known that thin, flat plates are generally not well suited for carrying loads perpendicular to their surface.

Although flat plates can be stiffened somewhat by increasing the thickness of the plates, in dump body applications merely thickening all of the plates is not a desirable option, as such an approach increases the weight of the dump body, thus lowering the hauling capacity of the haulage vehicle. Consequently, thin plates are often welded to other reinforcing supporting plates disposed at intervals, or are otherwise connected to and supported by a network of supporting frame members. The thin plates serve the goal of keeping the overall weight down, while the other reinforcing members provide the necessary strength. Two examples of typical prior art construction techniques are shown in FIGS. 8 and 9, both of which experience significant stress along the weld lines indicated as $W_1$ and $W_2$ in FIG. 8, and $W_3$ in FIG. 9.

Unfortunately, according to conventional construction techniques, such joints often experience problems, such as, by way of example rather than limitation, problems with metal fatigue. This metal fatigue is often most prevalent precisely at the weld lines in the dump body.

BRIEF DESCRIPTION OF THE DRAWINGS

FIG. 2A is an enlarged fragmentary view in perspective taken from below and from the opposite side of the joint shown in FIG. 2;

FIG. 4 is an enlarged fragmentary view in perspective taken similar to FIG. 2 and illustrating a joint between a thin plate and another plate in accordance with the teachings of a second disclosed embodiment of the present invention;

FIG. 4a is an enlarged fragmentary view in perspective illustrating a joint between a thin plate and another plate in accordance with the teachings of an alternative disclosed embodiment of FIG. 4;

FIG. 6a is an enlarged fragmentary view in perspective taken at the circumscribed portion of FIG. 1 of a joint assembly in accordance with the teachings of a fourth disclosed embodiment of the present invention;

FIG. 6b is an enlarged fragmentary view in perspective taken at the circumscribed portion of FIG. 1 of a joint assembly in accordance with the teachings of a fifth disclosed embodiment of the present invention;

FIG. 6c is an enlarged fragmentary view in perspective taken at the circumscribed portion of FIG. 1 of a joint assembly in accordance with the teachings of a sixth disclosed embodiment of the present invention;

DETAILED DESCRIPTION OF THE PREFERRED EMBODIMENT

The following description of the disclosed embodiments are not intended to limit the scope of the invention to the precise form or forms detailed herein. Instead, the following description is intended to be illustrative of the principles of the invention so that others may follow its teachings.

Figure 1:
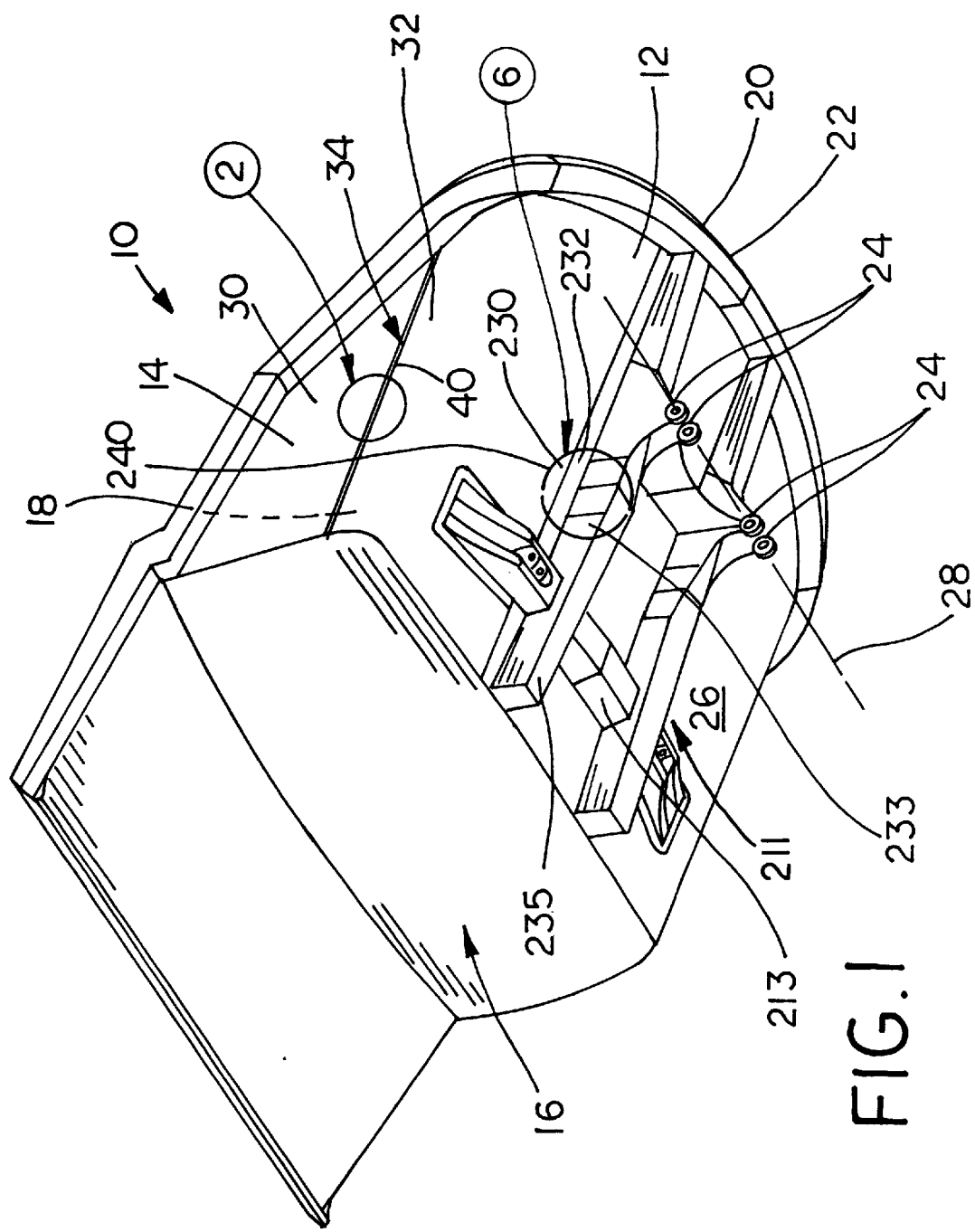
FIG. 1 is a perspective view taken from below of a dump body assembled in accordance with the teachings of the present invention.

Referring now to FIG. 1 of the drawings, a dump body assembled in accordance with the teachings of the present invention is generally referred to by the reference numeral 10. It will be understood that the dump body 10, in a preferred environment of use, is for attachment to an off-highway rubber-tired haulage vehicle (not shown) or other suitable vehicles in which the dump body 10 may prove beneficial. However, the teachings of the invention are not limited to off-highway rubber-tired haulage vehicles, to dump bodies, or to any other particular environment of use.

The dump body 10 includes a floor 12, a pair of sidewalls 14 (only a single sidewall is visible in FIG. 1). The other sidewall may be a mirror image of the one shown. The dump body 10 also includes a front wall 16. The floor 12, the sidewalls 14, and the front wall 16 cooperate to generally define a payload space 18. The dump body 10 includes a rearward portion 20 defining a spillway 22. A pair of brackets 24 are provided on a bottom surface 26 of the floor 12, which brackets 24 enable the dump body 10 to pivot relative to the frame of a dump truck (not shown) about an axis 28 using one or more conventional actuators (not shown) of the type commonly employed in the art.

Figure 2:
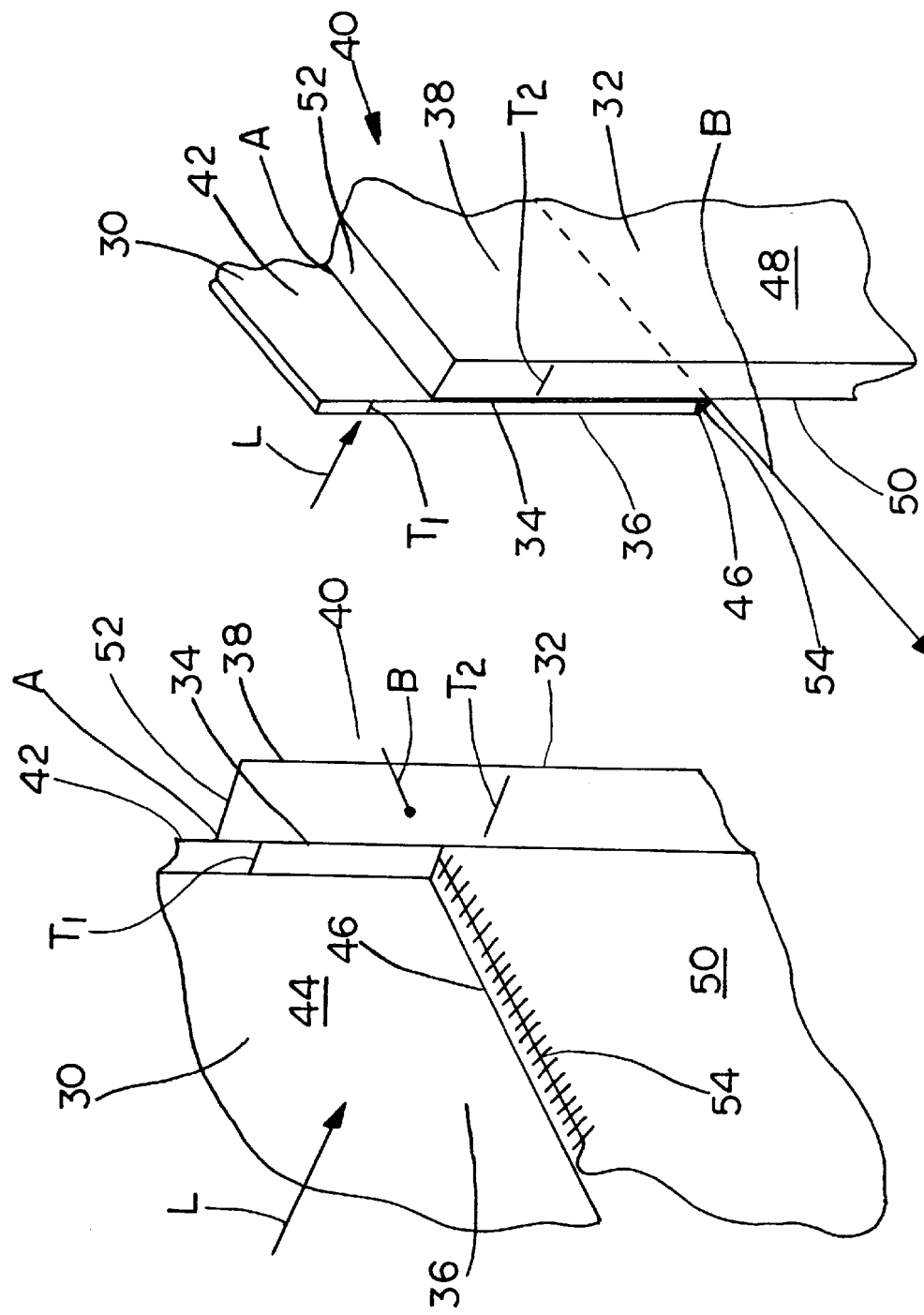
FIG. 2 is an enlarged fragmentary view in perspective taken from above at the circumscribed portion of FIG. 1 and illustrating a joint between a thin plate and another plate assembled in accordance with the teachings of a first disclosed embodiment of the present invention.

The dump body 10 also includes a pair of plates 30, 32 which meet in overlapping relationship to define an elongated seam 34. As shown in FIG. 2, the plate 30 forms a lower portion 36 of the sidewall 14, while the plate 32 forms an upper portion 38 of the floor 12. The lower portion 36 of the plate 30 and the upper portion 38 of the plate 32 are joined together to form a joint 40 disposed generally along the elongated seam 34. Although the joint 40 is shown at an intersection between the sidewall 14 and an upturned portion of the floor 12, it will understood that the teachings disclosed herein are equally applicable to other seams formed at the intersection of other plates used in the construction of the dump body 10.

Figure 3:
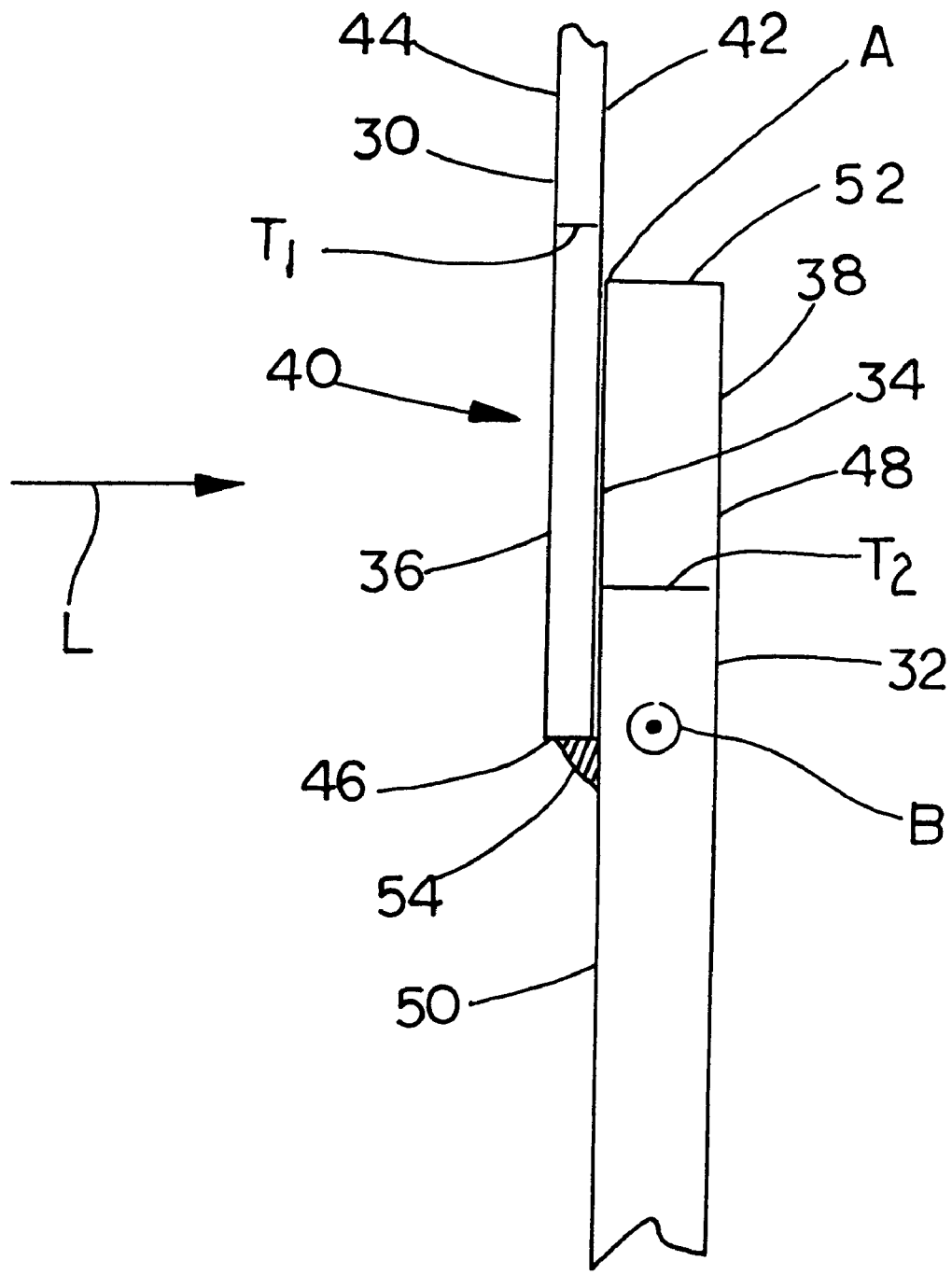
FIG. 3 is a cross-sectional view thereof.

Referring to FIGS. 2, 2A and 3, the plate 30 includes a pair of opposed faces 42, 44 and an elongated edge 46, while the plate 32 includes a pair of opposed faces 48, 50 and an elongated edge 52. A weld 54, which may be, for example and not limitation, a fillet weld, extends along the elongated edge 46 of the plate 30, and interconnects the elongated edge 46 of the plate 30 to the face 50 of the plate 32. It will be noted that there is no weld securing the elongated edge 52 of the plate 32 to the face 42 of the plate 30. The weld 54 may be continuous along a length of the plates 30, 32. Alternatively, the weld 54 may consist of a plurality of discrete weld sections (not shown).

It will be noted from each of FIGS. 2, 2A and 3 that the plate 30 includes a thickness $T_1$ while the plate 32 includes a thickness $T_2$. It will also be understood that the plates 30, 32 will experience a load generally indicated by the reference arrow L due to the payload carried in the payload space 18 of the dump body. As shown, the load L is applied to the face 44 of the plate 30 above the seam 34, and to the face 50 of the plate 32 below the seam 34. Other loads may be applied simultaneously along one or more different directions as would be known to those of skill in the art.

Figure 8:
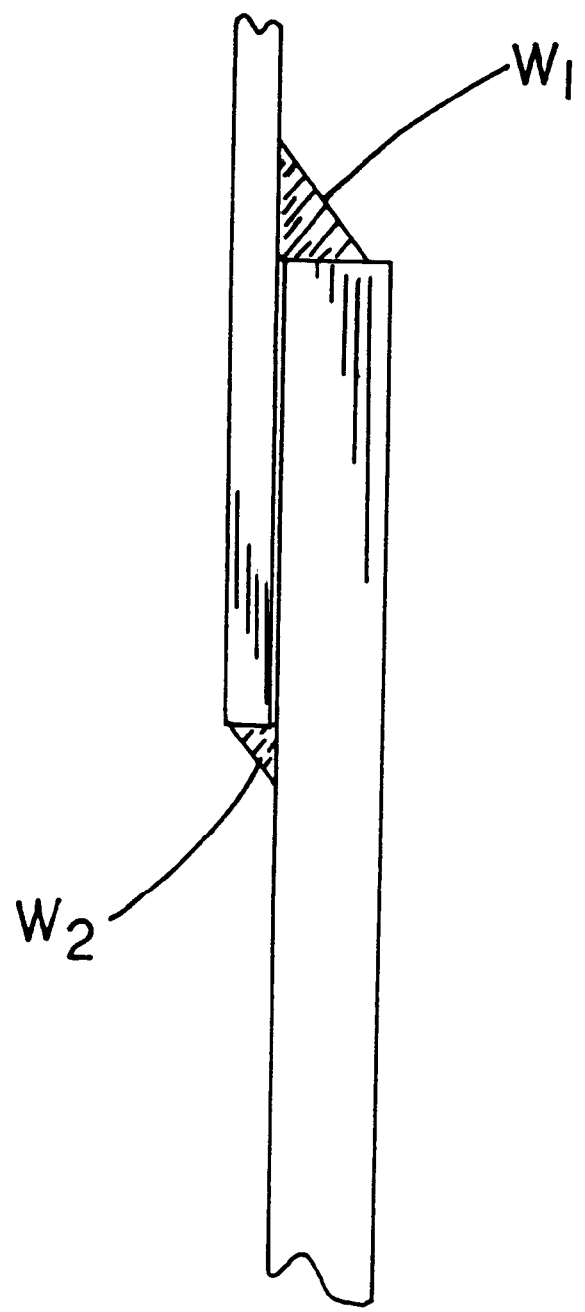

In operation, the plates 30, 32 may be assembled as shown using conventional welding techniques and conventional materials. As shown in FIG. 3, stress at the line of intersection (indicated as "A" in FIG. 3) between the edge 52 of the plate 32 and the face 42 of the plate 30 will be lessened and or minimized, if not eliminated entirely. This may be compared to the prior art construction illustrated in FIG. 8, in which two welds are employed along the seam as indicated by $W_1$ and $W_2$. As would be evident to those of skill in the art, in the conventional construction, in response to application of the load L stresses would be present along both of the welds $W_1$ and $W_2$.

Referring again to FIGS. 2, 2A and 3, in response to the application of the load L as shown, the upper portion 38 of the plate 32 may bend slightly about the line B (or about a line extending generally parallel to the line B), due at least in part to the face 42 of the plate 30 pressing against the face 50 of the upper portion 38 of the plate 32. Consequently, the upper portion 38 of the plate 32 applies a resistive, spring-like force as the plate 32 (e.g., the upper portion 38 of the plate 32) resists bending about the line B or about a line extending generally parallel to the line B. Again, this occurs without causing a stress riser at the line A, thus reducing metal fatigue related problems along the line A.

Figure 5:
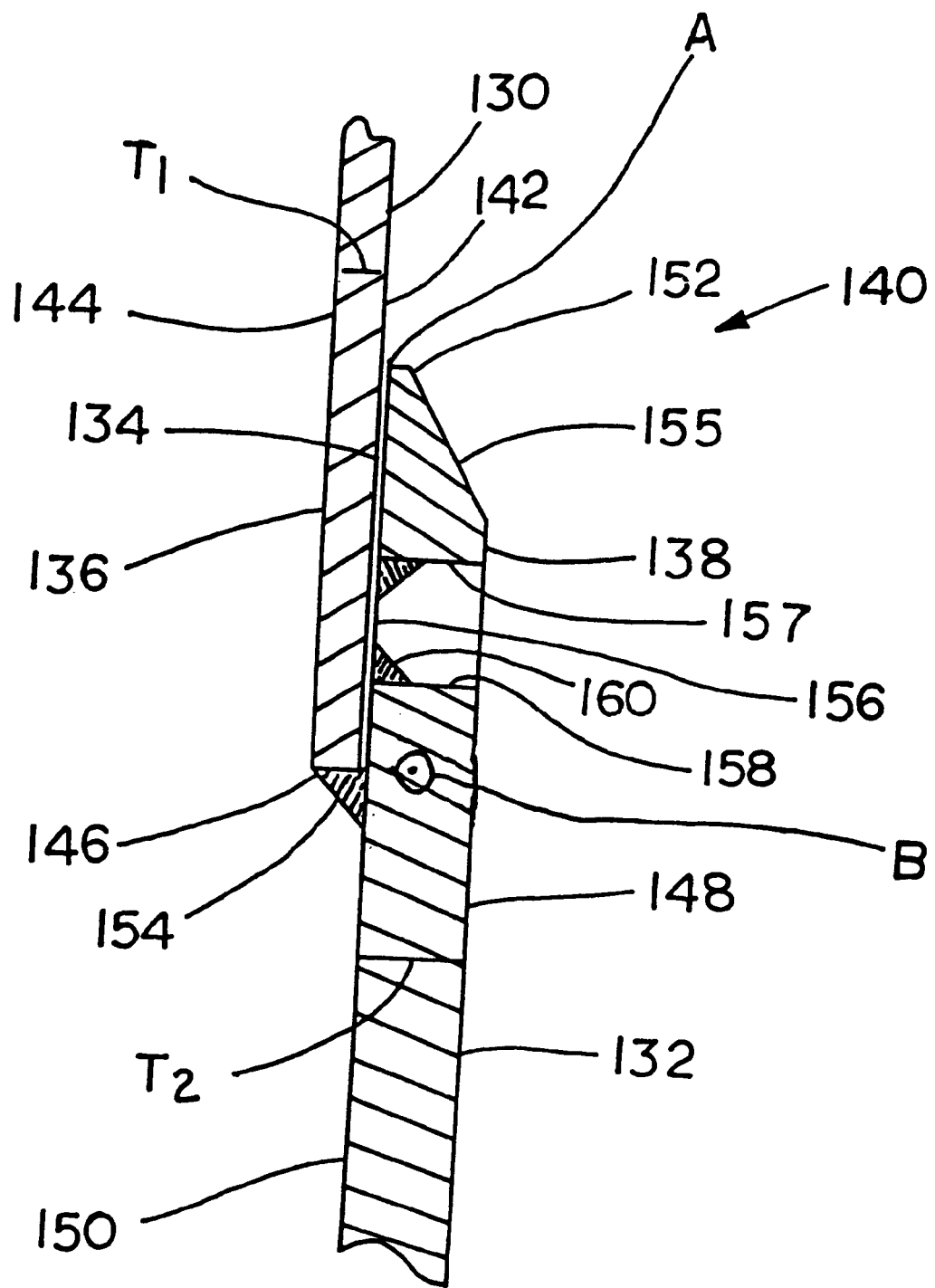
FIG. 5 is a cross-sectional view taken along line 5—5 of FIG. 4.
Figure 9:
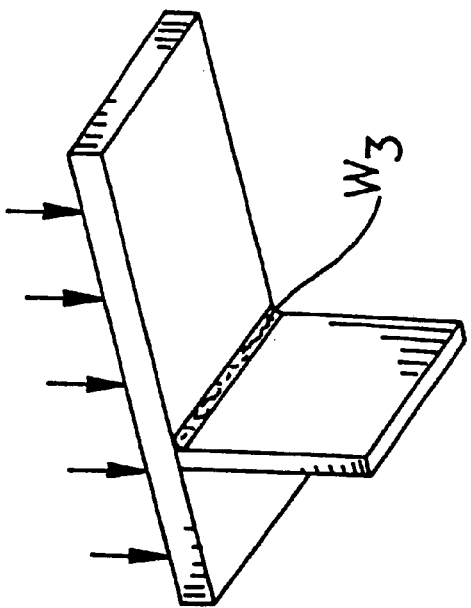
FIGS. 8 and 9 illustrate joints between plates assembled in accordance with the prior art.

Referring now to FIGS. 4 and 5, a joint 140 shown therein is assembled in accordance with the teachings of a second disclosed embodiment of the present invention. Again, the joint 140 is disposed along a seam 134 defined by overlapping portions of adjacent plates 130, 132, similar to that described above with respect to the first embodiment, with a lower portion 136 of the plate 130 and an upper portion 138 of the plate 132 overlapping at the seam 134.

The plate 130 includes a pair of opposed faces 142, 144 and an elongated edge 146, while the plate 132 includes a pair of opposed faces 148, 150 and an elongated edge 152. A weld 154, which may be, for example and not limitation, a fillet weld, extends along the elongated edge 146 of the plate 130, and interconnects the elongated edge 146 of the plate 130 to the face 150 of the plate 132. It will be noted that there is no weld securing the elongated edge 152 of the plate 132 to the face 142 of the plate 130. In a preferred form, the weld 154 may be continuous along a length of the plates 130, 132. Alternatively, the weld 154 may consist of a plurality of discrete weld sections (not shown).

It will be noted from each of FIGS. 4 and 5 that the plate 130 includes a thickness $T_1$ while the plate 32 includes a thickness $T_2$. It will further be noted that in the disclosed embodiment, the thickness $T_1$ is less than the thickness $T_2$.

In the embodiment of FIGS. 4 and 5 the elongated edge 152 of the plate 132 includes a chamfered portion 155. A plurality of apertures 157 are spaced at intervals along the upper portion 138 of the plate 132, with the apertures 157 being spaced away from the elongated edge 152. As shown in FIG. 5, each aperture 157 will reveal an exposed portion 156 of the face 142 of the plate 130. Each aperture 157 includes a perimeter 158, and a weld 160, for example a fillet or other suitable weld may be provided, such that at least part of the exposed portion 156 of the face 142 is secured to the perimeter 158 of the aperture 157, thus further securing the plates 130, 132 together.

In a preferred form, the weld 160 may extend substantially around the perimeter 158 of the aperture 157. Alternatively, the weld 160 may take the form of a single weld section within the perimeter 158 or a plurality of discrete weld sections within the perimeter 158.

In operation, the plates 130, 132 also may be assembled using conventional welding techniques and conventional materials. As shown in FIG. 5, stress at the line of intersection (indicated as "A" in FIG. 5) between the edge 152 of the plate 132 and the face 142 of the plate 130 will be lessened and/or minimized, if not eliminated entirely. Further, in response to the application of the load L as shown, the upper portion 138 of the plate 132 may bend slightly about the line B (or about a line extending generally parallel to the line B), such that the upper portion 138 applies a resistive, spring-like force as the plate resists bending about the line B. Again, this occurs without causing a stress riser at the line A, thus reducing metal fatigue related problems along the line A. This load is further resisted by the weld 160 in the apertures 157.

As an alternative, the apertures 157 and the weld 160 may be replaced with a line of mechanical fasteners 162 disposed at intervals along the seam 140 as shown in FIG. 4a. In the illustrated embodiment, three mechanical fasteners 162 which may be, for example and not limitation a set of nut and bolt fasteners, are inserted through apertures 157 which are extended through both the plates 130 and 132 to hold the two plates 130 and 132 together. The size, location, and spacing of such mechanical fasteners may be readily calculated using known engineering principles.

Figure 6:
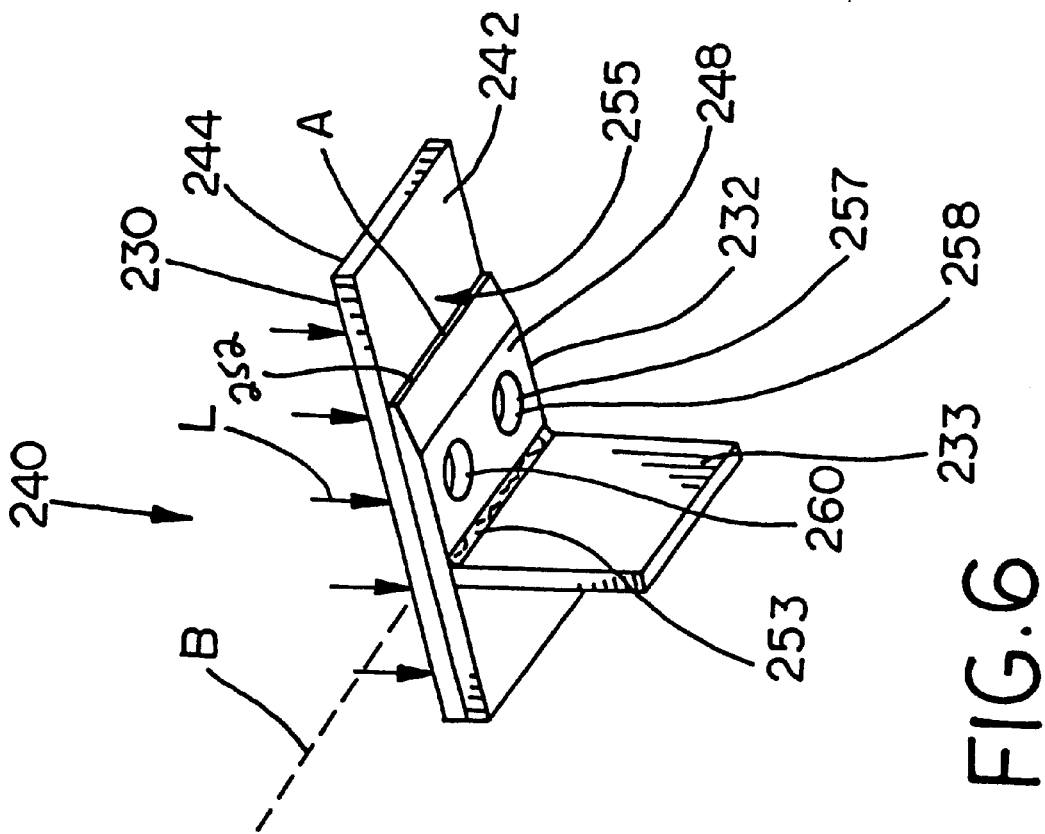
FIG. 6 is an enlarged fragmentary view in perspective taken at the circumscribed portion of FIG. 1 of a joint assembly in accordance with the teachings of a third disclosed embodiment of the present invention.
Figure 7:
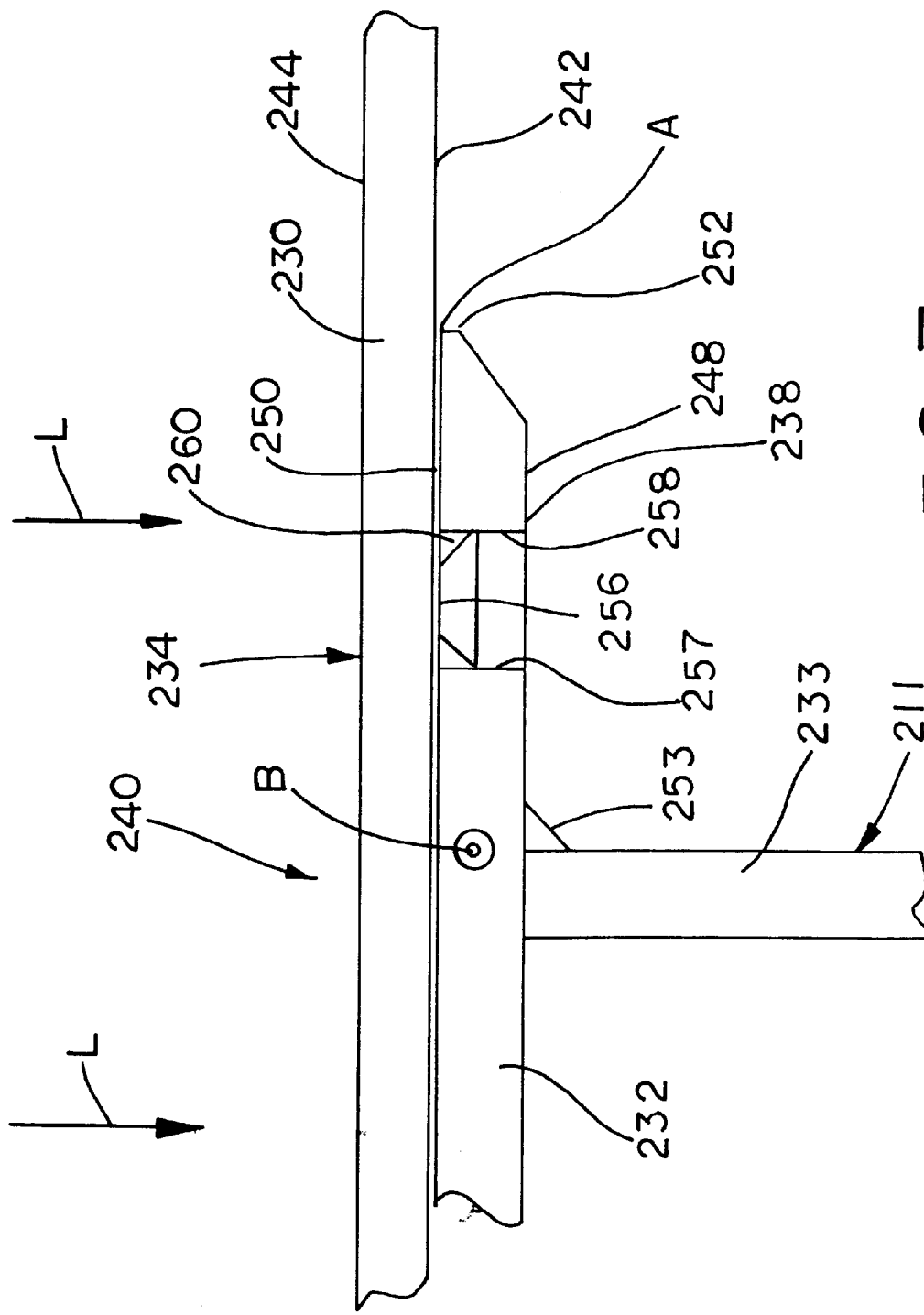
FIG. 7 is an a cross-sectional view of FIG. 6.

Referring now to FIGS. 6 and 7, a joint 240 is formed by overlapping portions of a long plate 230 and a short plate 232. Both of the plates 230 and 232 carry a load L, and both plates are supported by a frame member 233 (the plates 230, 232 and the frame member 233 are also shown in FIG. 1). It will be understood that the joint 240, in a preferred environment of use, forms a part of the dump body 10 (FIG. 1) of an off-highway rubber-tired haulage vehicle, as well as in other applications in which the details (to be discussed below) of the joint 240 may prove beneficial. However, the application of the joint 240 is not limited to any particular environment of use.

In the disclosed example, and referring to FIG. 1, the frame member 233 forms part of a generally box-shaped stiffener 211, which extends generally transverse relative to the pivot axis 28. In the disclosed example, a pair of such box-shaped stiffeners 211 are provided, with additional or fewer such stiffeners 211 being provided as needed. Another such box-shaped stiffener 213 may also be provided extending generally parallel to the axis of rotation 28. Again, additional or fewer stiffeners may be used. In the disclosed example, the stiffener 211 typically includes the frame member 233 consisting of a generally vertically oriented plate, another vertically oriented plate (mostly obscured in FIG. 1) spaced away from the frame member 233, and an interconnecting bottom plate 235.

Referring to FIGS. 6 and 7, the plate 230 is long relative to the plate 232 (e.g., the plate 230 extends further to the right and further to the left when viewing FIGS. 6 and 7, much further than the plate 232 which is visible in outline in FIG. 1 and which, in the disclosed example, generally surrounds the stiffeners 211 and 213).

The plate 230 includes faces 242, 244. In the preferred environment of use, the face 242 may be referred to as a bottom face, while the face 244 may be referred to as a top face. The plate 232 includes faces 248, 250, and includes an elongated edge 252. Again, in the preferred environment of use and when oriented in the in use position shown, the face 248 may be referred to as a bottom face, while the face 250 may be referred to as a top face 250. Thus, the top face 250 of the plate 232 abuts the bottom face 242 of the plate 230. The plate that forms a portion of the frame member 233 abuts the bottom face 248 of the plate 232, and is joined thereto by a weld 253.

The elongated edge 252 of the plate 232 includes a chamfered portion 255, and a plurality of apertures 257 are spaced at intervals along the seam 234, with the apertures 257 being spaced away from the elongated edge 252. The size, location, and spacing of such apertures may be readily calculated using known engineering principles.

As shown in FIG. 7, each aperture 257 will expose a portion 256 of the bottom face 242 of the plate 230. Each aperture 257 includes a perimeter 258, and a weld 260, for instance a fillet weld, may be provided, such that part of the exposed portion 256 of the face 242 is secured to the perimeter 258 of the aperture 257, thus further securing the plates 230, 232 together. In a preferred form, the weld 260 may extend substantially around the perimeter 258 of the aperture 257. Alternatively, the weld 260 may take the form of a single weld section within the perimeter 258 or a plurality of discrete weld sections within the perimeter 258. As a further alternative, the apertures 257 and the weld 260 may be replaced with a line of mechanical fasteners (not shown) disposed along the seam 234.

In operation, the plates 230, 232 also may be assembled using conventional welding techniques and conventional materials. As shown in FIG. 6 and 7, stress at the line of intersection A between the edge 252 of the plate 232 and the face 242 of the plate 230 will be lessened and/or minimized, if not eliminated entirely. Further, in response to the application of the load L as shown, a portion 238 of the plate 232 may bend slightly roughly about a line B extending into the plane of FIG. 7, such that the portion 238 applies a resistive, spring-like force as the plate 232 resists bending about the line B. Again, this occurs without causing a stress riser at the line A, thus reducing metal fatigue related problems along the line A. The load L may further be resisted by including the weld 260 in the apertures 257.

Referring now to FIGS. 6a, 6b and 6c, there is illustrated three alternative embodiments of the joint 240, illustrated as joint 240a, joint 240b, and joint 240c.

Turning to FIG. 6a, there is illustrated a plate 230a which is long relative to a plate 232a. The plate 230a includes faces 242a, 244a. In the illustrated embodiment, the face 242a may be referred to as a bottom face, while the face 244a may be referred to as a top face. The plate 232a includes faces 248a, 250a, 251a and includes an elongated edge 252a. Again, in the illustrated environment of use and when oriented in the in use position shown, the face 248a may be referred to as a bottom face, the face 250a may be referred to as a top face, and the face 251a may be referred to as a side face. Thus, the top face 250a of the plate 232a abuts the bottom face 242a of the plate 230a. The plate that forms a portion of the frame member 233a abuts the bottom face 242a of the plate 230a, and the plate that forms a portion of the frame member 233a also abuts the side face 251a of the plate 232a and is joined thereto by a weld 253a. A weld 254a may also be provided to join the frame member 233a to the plate 230a, 232a.

As shown in FIG. 6a, each aperture 257a will expose a portion of the bottom face 242a of the plate 230a. Each aperture 257a includes a perimeter 258a, and a weld 260a, for instance a fillet weld, may be provided, such that part of the exposed portion of the face 242a is secured to the perimeter 258a of the aperture 257a, thus further securing the plates 230a, 232a together. In a preferred form, the weld 260a may extend substantially around the perimeter 258a of the aperture 257a. Alternatively, the weld 260a may take the form of a single weld section within the perimeter 258a or a plurality of discrete weld sections within the perimeter 258a. As a further alternative, the apertures 257a and the weld 260a may be replaced with a line of mechanical fasteners (not shown).

Turning to FIG. 6b, there is illustrated a plate 230b which is long relative to a plate 232b. The plate 230b includes faces 242b, 244b. In the illustrated embodiment, the face 242b may be referred to as a bottom face, while the face 244b may be referred to as a top face. The plate 232b includes faces 248b, 250b, 251b and includes an elongated edge 252b. Again, in the illustrated environment of use and when oriented in the in use position shown, the face 248b may be referred to as a bottom face, the face 250b may be referred to as a top face, and the face 251b may be referred to as a side face. Additionally, a portion of the frame member 233b includes faces 234b, 235b. The face 234b may be referred to as the top face, while the face 235b may be referred to as the bottom face. Thus, the top face 250b of the plate 232b abuts the bottom face 235b of the frame member 233b. The frame member 233b abuts the bottom face 242b of the plate 230b and is joined thereto by a weld 254b. The side face 251b of the plate 232b abuts the bottom face 242b of the plate 230b and is joined thereto by a weld 253b.

As shown in FIG. 6b, each aperture 257b will expose a portion of the bottom face 235b of the supporting member 233b. Each aperture 257b includes a perimeter 258b, and a weld 260b, for instance a fillet weld, may be provided, such that part of the exposed portion of the face 235b is secured to the perimeter 258b of the aperture 257b, thus further securing the supporting member 233b and the plate 232b together. In a preferred form, the weld 260b may extend substantially around the perimeter 258b of the aperture 257b. Alternatively, the weld 260b may take the form of a single weld section within the perimeter 258b or a plurality of discrete weld sections within the perimeter 258b. As a further alternative, the apertures 257b and the weld 260b may be replaced with a line of mechanical fasteners (not shown).

Finally, turning to FIG. 6c, there is illustrated a joint 240c which is constructed in a similar manner as joint 240b. In the illustrated embodiment, a plate 230c is long relative to a plate 232c. The plate 230c includes faces 242c, 244c. In the illustrated embodiment, the face 242c may be referred to as a bottom face, while the face 244c may be referred to as a top face. The plate 232c includes faces 248c, 250c, 251c and includes an elongated edge 252c. Again, in the illustrated environment of use and when oriented in the in use position shown, the face 248c may be referred to as a bottom face, the face 250c may be referred to as a top face, and the face 251c may be referred to as a side face. Additionally, a portion of the frame member 233c includes faces 234c, 235c. The face 234c may be referred to as the top face, while the face 235c may be referred to as the bottom face. Additionally, a plate 261c includes faces 262c, 264c. The face 262c may be referred to as the top face, while the face 264c may be referred to as the bottom face. Thus, the top face 250c of the plate 232c abuts the bottom face 235c of the frame member 233c. The frame member 233c abuts the bottom face 242c of the plate 230c and is joined thereto by a weld 254c. The side face 251c of the plate 232c abuts the bottom face 242c of the plate 230c and is joined thereto by a weld 253c. The bottom face 264c of the plate 261c abuts the top face 244c of the plate 230c and is joined thereto by a weld 270c.

Similar to the joint 240b, as shown in FIG. 6c, each aperture 257c will expose a portion of the bottom face 235c of the supporting member 233c. Each aperture 257c includes a perimeter 258c, and a weld 260c, for instance a fillet weld, may be provided, such that part of the exposed portion of the face 235c is secured to the perimeter 258c of the aperture 257c, thus further securing the supporting member 233c and the plate 232c together. Furthermore, an aperture (hidden and thus not shown) in the plate 261c will expose a portion of the top face 244c of the plate 230c. Each aperture (hidden) includes a perimeter (hidden and thus not shown), and a weld (hidden and thus not shown) such that the part of the exposed portion of the face 244c is secured to the perimeter (not shown) of the aperture (not shown), thus further securing the plates 261c, 230c together.

In a preferred form, the weld 260b and the weld (hidden, securing the plate 261c) may extend substantially around the perimeter 258b of the aperture 257b as well as the perimeter of the aperture in the plate 261c. Alternatively, the welds may take the form of a single weld section within the perimeters or a plurality of discrete weld sections within the perimeters. As a further alternative, the apertures and the welds may be replaced with a line of mechanical fasteners (not shown).

In order to further improve the performance of the dump body 10, the dump body 10 may also be provided with a perimeter reinforcing beam as outlined in copending and commonly assigned U.S. patent application Ser. No. 10/152,595, the entire disclosure of which is hereby incorporated herein by reference.

Further, in order to still further improve the performance of the dump body 10, the dump body 10 may also be provided with one or more of a curved floor, curved sidewalls, a curved front wall, and/or a curved cab protector, as outlined in copending and commonly assigned U.S. patent application Ser. No. 10/152,889, the entire disclosure of which is hereby incorporated herein by reference.

A joint isolation system according to the teachings of the present invention may be used on a variety of fabricated structures such as, by way of example rather than limitation, a dump body for off-highway trucks. In accordance with the disclosed example, the joint isolation system may provide a more fatigue resistant joint by isolating the highest stresses from the fatigue prone features of the joint, such as welds or fasteners. Joint isolation in accordance with the disclosed example may be enabled at least in part by providing a spring-like supporting member that distributes the highest stresses to a location without fatigue prone features.

When the dump body is loaded, the payload pushes on the floor, the sidewalls, and the front wall, and these forces are distributed within the structure in a manner dependent on the stiffness of the members as would be known applying known engineering principles. As the main plates (upon which the material is bearing) are made thinner in order to save weight or for other considerations, the stresses in these thinner plates become higher, and the fatigue life may be dramatically reduced when using conventional fabrication techniques.

It is known that the fatigue resistance of welded structures is typically much less than that of the parent metal. The lower fatigue life is usually seen at the toe of the welds and, according to conventional wisdom, is caused by microscopic defects created during the welding process, stress riser caused by the geometry of the weld, and by very high residual tensile stresses inherent with the melting and re-solidification during the welding process.

A joint assembled according to the disclosed example of the present invention may allow higher working stresses to be tolerated by isolating the welds from the high stress areas of the structure. This isolates the microscopic defects, stress risers, and the residual stresses from the high stress zone, allowing the parent material to provide the increased fatigue performance.

The joint isolation system may be implemented in several ways. One embodiment is a splice joint between two thicknesses of plates. According to the first disclosed example, the critical toe of the fillet weld is on the thicker member. The material bearing on the inside of the dump body causes the interface between the two plates to bear against one another with the thick plate acting as a spring supporting the thinner plate. The highest stress location on the thin plate is where it is supported by the thicker plate and there is no weld, therefore the fatigue life is improved.

According to the second disclosed example (FIGS. 6 and 7), a joint in the area of a stiffener or reinforcement is provided. In this example, the critical toe of the fillet weld is on the plate 232, and this location is strengthened by both of plates 232 and 230. The material bearing on the inside of the body causes the interface between the two plates to bear against one another with the short plate (232) acting as a spring supporting the long plate (230). The highest stress location on the long plate is where it is supported by the short plate (at or near line A) where there is no weld, and therefore the fatigue life is improved.

Optional features such as chamfers, holes, holes with perimeter welds, fasteners, or other means can be used to optimize the behavior the joint. The joint could even be made free of all welds by using fasteners instead.

A dump body assembled in accordance with the exemplary features disclosed herein will experience a significant weight reduction for the dump body by allowing the main plates to be made thinner. The resulting lighter weight dump body allows the dump truck to operate more efficiently, use less fuel, or allow more payload to be hauled, while still providing an acceptable service life.

Those skilled in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

What is claimed:

1. A method of forming a stress isolating joint on a dump body, comprising the steps of:
    providing a first plate, the first plate having an elongated edge and a face;
    providing a second plate, the second plate having an elongated edge;
    positioning the first and second plates adjacent each other in overlapping relationship to thereby define a widened seam bounded at least in part by the elongated edge of the first plate and the elongated edge of the second plate;
    welding the first plate to the second plate only exclusively along the elongated edge of the first plate; and
    providing at least one aperture through the second plate, the apertures spaced from the elongated edge of the second plate so as to be disposed along the widened seam, the aperture defining an internal edge abutting the face of the first plate, and forming a perimeter weld in the aperture to join at least a portion of the internal edge to the face of the first plate.

2. The method of claim 1, including the step of chamfering the elongated edge of the second plate.

3. A method of forming a stress isolating joint on a dump body, comprising the steps of:
    providing a first plate, the first plate having an elongated edge and a face;
    providing a second plate, the second plate having an elongated edge;
    positioning the first and second plates adjacent each other in overlapping relationship to thereby define a widened seam bounded at least in part by the elongated edge of the first plate and the elongated edge of the second plate;
    welding the first plate to the second plate only exclusively along the elongated edge of the first plate;
    providing a third plate, the third plate having an elongated edge;
    positioning the elongated edge of the third plate perpendicular the widened seam; and
    welding the elongated edge of the third plate to the second plate.

4. The method of claim 3, including the step of chamfering the elongated edge of the second plate.

5. The method of claim 3, including the steps of providing at least one aperture through the second plate, the apertures spaced from the elongated edge of the second plate so as to be disposed along the widened seam, the aperture defining an internal edge abutting the face of the first plate, and forming a perimeter weld in the aperture to join at least a portion of the internal edge to the face of the first plate.

6. A method of forming a stress isolating joint on a dump body, comprising the steps of:
    providing a first plate, the first plate having an elongated edge, a first face, and a second face, the first plate further having a first thickness;
    providing a second plate, the second plate having an elongated edge and a face;
    providing a third plate, the third plate having a first elongated edge and a second elongated edge;
    positioning the elongated edge of the second plate adjacent the first elongated edge of the third plate to thereby define a widened elongated edge;
    positioning the widened elongated edge perpendicular the first face of the first plate; and
    welding the widened elongated edge to the first face of the first plate.

7. The method of claim 6, including the step of chamfering the second elongated edge of the third plate.

8. The method of claim 6, including the steps of providing at least one aperture through the third plate, the apertures spaced from the second elongated edge of the third plate so as to be disposed adjacent the face of the second plate, the aperture defining an internal edge abutting the face of the second plate, and forming a perimeter weld in the aperture to join at least a portion of the internal edge to the face of the second plate.

9. The method of claim 6, including the steps of providing a fourth plate, the fourth plate having an elongated edge, positioning the fourth plate and second face of the first plate adjacent each other in overlapping relationship to thereby define a widened seam bounded at least in part by the elongated edge of the first plate and the elongated edge of the fourth plate, and welding the fourth plate to the second face of the first plate only exclusively along the elongated edge of the fourth plate.

10. The method of claim 9, including the step of chamfering the elongated edge of the fourth plate.

11. The method of claim 9, including the steps of providing at least one aperture through the fourth plate, the apertures spaced from the elongated edge of the fourth plate so as to be disposed along the widened seam, the aperture defining an internal edge abutting the second face of the first plate, and forming a perimeter weld in the aperture to join at least a portion of the internal edge to the second face of the first plate.

* * * * *

UNITED STATES PATENT AND TRADEMARK OFFICE
CERTIFICATE OF CORRECTION

PATENT NO. : 6,754,945 B2
DATED : June 29, 2004
INVENTOR(S) : Steven J. Fujan et al.

It is certified that error appears in the above-identified patent and that said Letters Patent is hereby corrected as shown below:

Column 9,
Line 22, delete "apertures" and insert instead -- aperture --.
Line 46, delete "positioning the elongated edge of the third plate perpendicular" and insert instead -- positioning the elongated edge of the third plate on the second plate such that the third plate is perpendicular --.

Column 10,
Lines 18-19, after "edge;" insert the new claim paragraph -- providing at least one aperture through the third plate, the aperture spaced from the second elongated edge of the third plate so as to be disposed adjacent the face of the second plate, the aperture defining an internal edge abutting the face of the second plate, and forming a perimeter weld in the aperture to join at least a portion of the internal edge to the face of the second plate; --.
Line 25, delete claim 8.
Line 33, renumber claim 9 as claim 8.
Line 42, renumber claim 10 as claim 9.
Lines 42 and 44, delete "The method of claim 9" and insert instead -- The method of claim 8 --.
Line 44, renumber claim 11 as claim 10.
Line 46, delete "apertures" and insert instead -- aperture --

Signed and Sealed this

Twenty-eighth Day of December, 2004

JON W. DUDAS
*Director of the United States Patent and Trademark Office*